United States Patent
Word et al.

(10) Patent No.: US 10,656,517 B2
(45) Date of Patent: May 19, 2020

(54) PATTERN CORRECTION IN MULTIPLE PATTERNING STEPS

(71) Applicant: Mentor Graphics Corporation, Wilsonville, OR (US)

(72) Inventors: James C. Word, Portland, OR (US); Shady AbdelWahed, Cairo (EG)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 15/002,051

(22) Filed: Jan. 20, 2016

(65) Prior Publication Data

US 2017/0205702 A1  Jul. 20, 2017

(51) Int. Cl.
| | |
|---|---|
| *G06F 17/50* | (2006.01) |
| *G03F 1/36* | (2012.01) |
| *G06F 30/20* | (2020.01) |
| *G06F 30/398* | (2020.01) |
| *G06F 19/00* | (2018.01) |
| *G06F 119/18* | (2020.01) |

(52) U.S. Cl.
CPC .............. *G03F 1/36* (2013.01); *G06F 30/20* (2020.01); *G06F 30/398* (2020.01); *G06F 19/00* (2013.01); *G06F 2119/18* (2020.01)

(58) Field of Classification Search
CPC .............. G06F 17/5009; G06F 17/5081; G06F 2217/12; G06F 19/00; G21K 5/00; G06K 9/00; G03F 1/00
USPC ........ 716/53, 54, 55, 111; 700/98, 120, 121; 378/34, 35; 430/4, 5; 382/144, 145, 154
See application file for complete search history.

(56) References Cited

U.S. PATENT DOCUMENTS

| | | | |
|---|---|---|---|
| 6,278,764 B1 * | 8/2001 | Barbee, Jr. ............. | B82Y 10/00 378/84 |
| 8,227,151 B2 | 7/2012 | Inanami et al. | |
| 8,683,394 B2 | 3/2014 | Simmons | |
| 8,713,488 B2 | 4/2014 | Sakajiri | |

(Continued)

OTHER PUBLICATIONS

Abercrombie, "Self-Aligned Double Patterning—Part Deux", HTTPS:// Semiengineering.com/author/david-abercrombie/, Aug. 14, 2014, 18 pages. (Year: 2014).*

(Continued)

*Primary Examiner* — Phallaka Kik
(74) *Attorney, Agent, or Firm* — Mentor Graphics Corporation

(57) ABSTRACT

This application discloses a computing system to simulate a wafer image based on a mandrel mask and a block mask to be utilized to print a final wafer image on a substrate. To simulate the wafer image the computing system can estimate dummy sidewalls based on the mandrel mask, estimate contours of the block mask, and determine the simulated wafer image based on differences between the dummy sidewalls and the estimated contours of the block mask. The computing system can compare the simulated wafer image against a target wafer image in a layout design to identify hotspots where the simulated wafer image deviates from the target wafer image. Based on the identified hotspots, the computing system can modify the target wafer image in the layout design, prioritize edge modification in a subsequent optical proximity correction process, or modify computation of image error, which drives the optical proximity correction process.

20 Claims, 9 Drawing Sheets

(56) References Cited

U.S. PATENT DOCUMENTS

| | | | |
|---|---|---|---|
| 8,856,698 B1 | 10/2014 | Latypov | |
| 8,881,070 B1 | 11/2014 | Lippincott | |
| 8,910,098 B1 | 12/2014 | Lei | |
| 9,459,523 B2 | 10/2016 | Tejnil | |
| 2005/0229125 A1* | 10/2005 | Tabery | G03F 7/705 |
| | | | 716/53 |
| 2008/0003510 A1* | 1/2008 | Harazaki | G03F 1/36 |
| | | | 430/5 |
| 2008/0145769 A1 | 6/2008 | Kawakami | |
| 2008/0282211 A1* | 11/2008 | Culp | G06F 17/5068 |
| | | | 716/54 |
| 2008/0301611 A1 | 12/2008 | Word | |
| 2009/0031262 A1 | 1/2009 | Maeda | |
| 2009/0123057 A1* | 5/2009 | Mukherjee | G06K 9/036 |
| | | | 382/144 |
| 2011/0191726 A1 | 8/2011 | Word | |
| 2012/0040280 A1* | 2/2012 | Agarwal | G03F 7/70433 |
| | | | 430/30 |
| 2012/0167020 A1 | 6/2012 | Abd El Wahed | |

OTHER PUBLICATIONS

Abercrombie, "Self-Aligned Double Patterning, Part One", HTTPS://semiengineering.com/author/david-abercrombie/, May 15, 2014, 16 pages. (Year: 2014).*

Y.-S.Woo et al., "Optical proximity correction enhancement by using model based fragmentation approaches," Proc. SPIE 7640, Optical Microlithography XXIII, 76401F (Mar. 3, 2010).

Jae-Hyun Kang et al., "Thickness-aware LFD for the hotspot detection induced by topology," Proc. SPIE 8327, pp. 1-10, Mar. 15, 2012.

* cited by examiner

PATTERN CORRECTION IN MULTIPLE PATTERNING STEPS

TECHNICAL FIELD

This application is generally related to self-aligned double patterning masks and, more specifically, to pattern correction for self-aligned double patterning masks in multiple patterning steps.

BACKGROUND

Electronic circuits, such as integrated circuits (ICs), are used in a variety of products, from automobiles to microwaves to personal computers. Designing and fabricating IC devices typically involves many steps, sometimes referred to as the "design flow." The particular steps of a design flow often are dependent upon the type of the circuit, its complexity, the design team, and the circuit fabricator or foundry that will manufacture the circuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing IC components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices.

Circuit layout descriptions can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. The diffractive effects of light often result in defects where the intended image is not accurately "printed" onto the substrate during the photolithographic process, creating flaws in the manufactured device. One or more resolution enhancement techniques (RETs) are often employed to improve the resolution of the image that the mask forms on the substrate during the photolithographic process.

One of these techniques, "optical proximity correction" or "optical process correction" (OPC), adjusts the amplitude of the light transmitted through a lithographic mask by modifying the layout design data employed to create the mask. For example, edges in the layout design may be adjusted to make certain portions of the geometric elements larger or smaller, in accordance with how much additional light exposure (or lack of exposure) is desired at certain points on the substrate. When these adjustments are appropriately calibrated, overall pattern fidelity can be improved.

Another technique, called multi-patterning, forms sub-wavelength features on a wafer by generating multiple exposing masks from layout design data, and recombining the multiple masks into the design target on the wafer. In one implementation of multi-patterning, a design target can be split into a line and space mask and a cut mask, which can remove unwanted parts from the line and space mask. The combination of the line and space mask with the cut mask can form a complex pattern in the design. In another implementation known as Self-Aligned Double Patterning (SADP), the mask is split into a mandrel mask and a block mask. The mandrel can have a sidewall image grown on it, for example, to halve the pitch, followed by a subsequent block mask. Since it is challenging to form an exact replica of the target image when two or more masks are used in combination, oftentimes, extra unwanted printing features may be formed, or needed features may be missing from the manufactured integrated circuits.

SUMMARY

This application discloses a computing system implementing a self-aligned double-patterning tool to simulate a wafer image based on a mandrel mask and a block mask. To simulate the wafer image the computing system implementing the self-aligned double-patterning tool can estimate dummy sidewalls based on the mandrel mask, estimate contours of the block mask, and determine the simulated wafer image based on differences between the dummy sidewalls and the estimated contours of the block mask. The computing system implementing the self-aligned double-patterning tool can compare the simulated wafer image against a target wafer image in a layout design to identify hotspots where the simulated wafer image deviates from the target wafer image. Based on the identified hotspots, the computing system implementing the self-aligned double-patterning tool can modify the target wafer image in the layout design, prioritize edge modification in a subsequent optical proximity correction process, or modify computation of image error, which drives the optical proximity correction process. Embodiments will be described below in greater detail.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a programmable computer system on which various embodiments of the invention may be employed will first be described. Further, because of the complexity of some electronic design automation processes and the large size of many circuit designs, various electronic design automation tools, security servers, or the like, can be configured to operate on a computing system capable of simultaneously running multiple processing threads.

Figure 1:
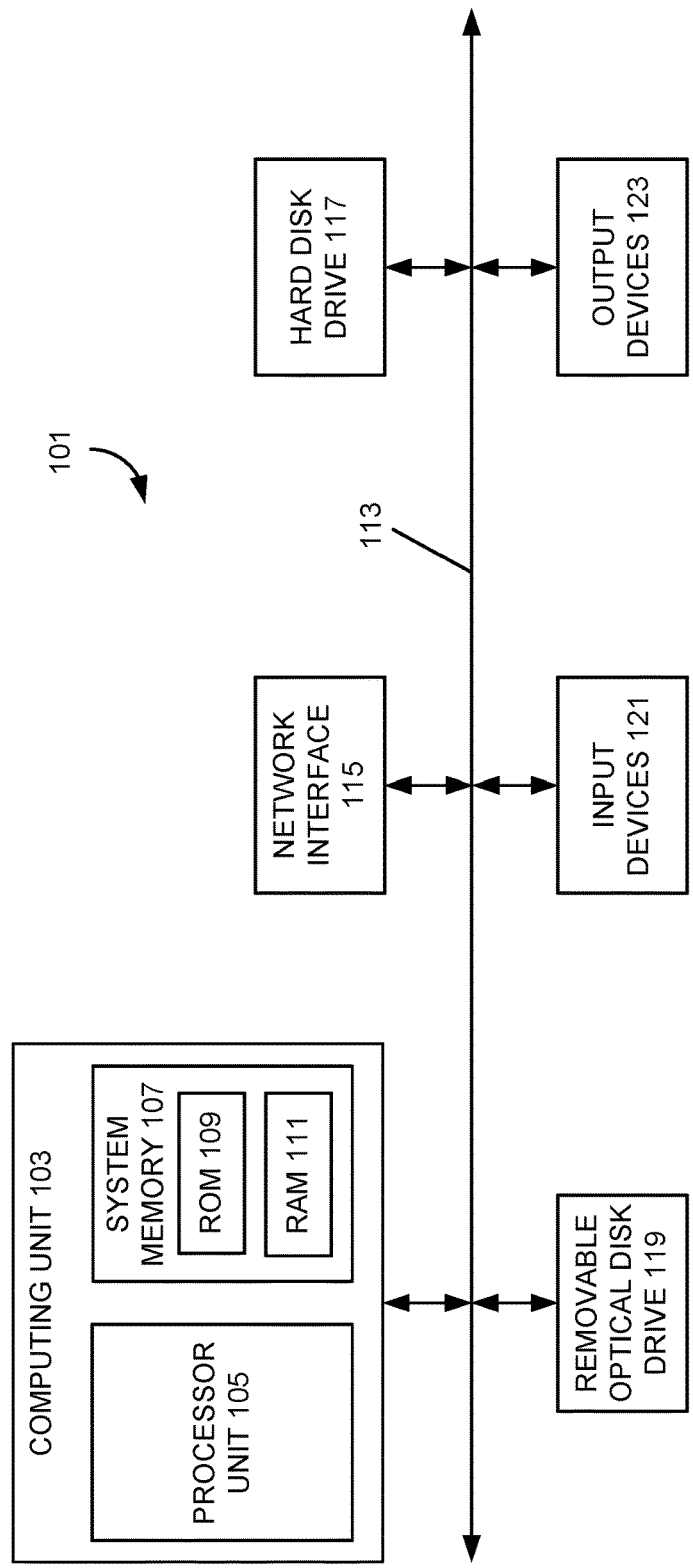
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
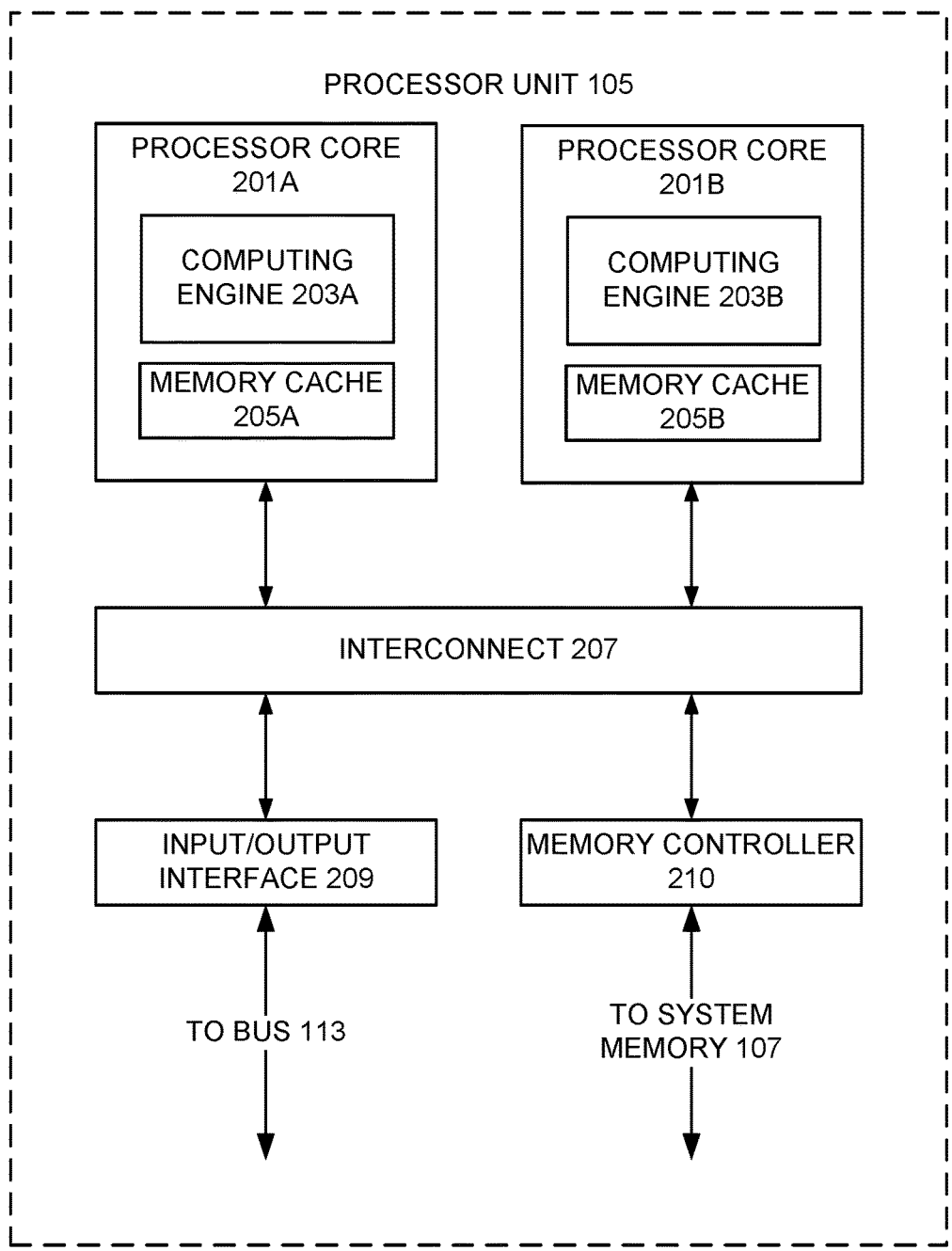

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Pattern Correction in Multiple Patterning Steps

Figure 3:
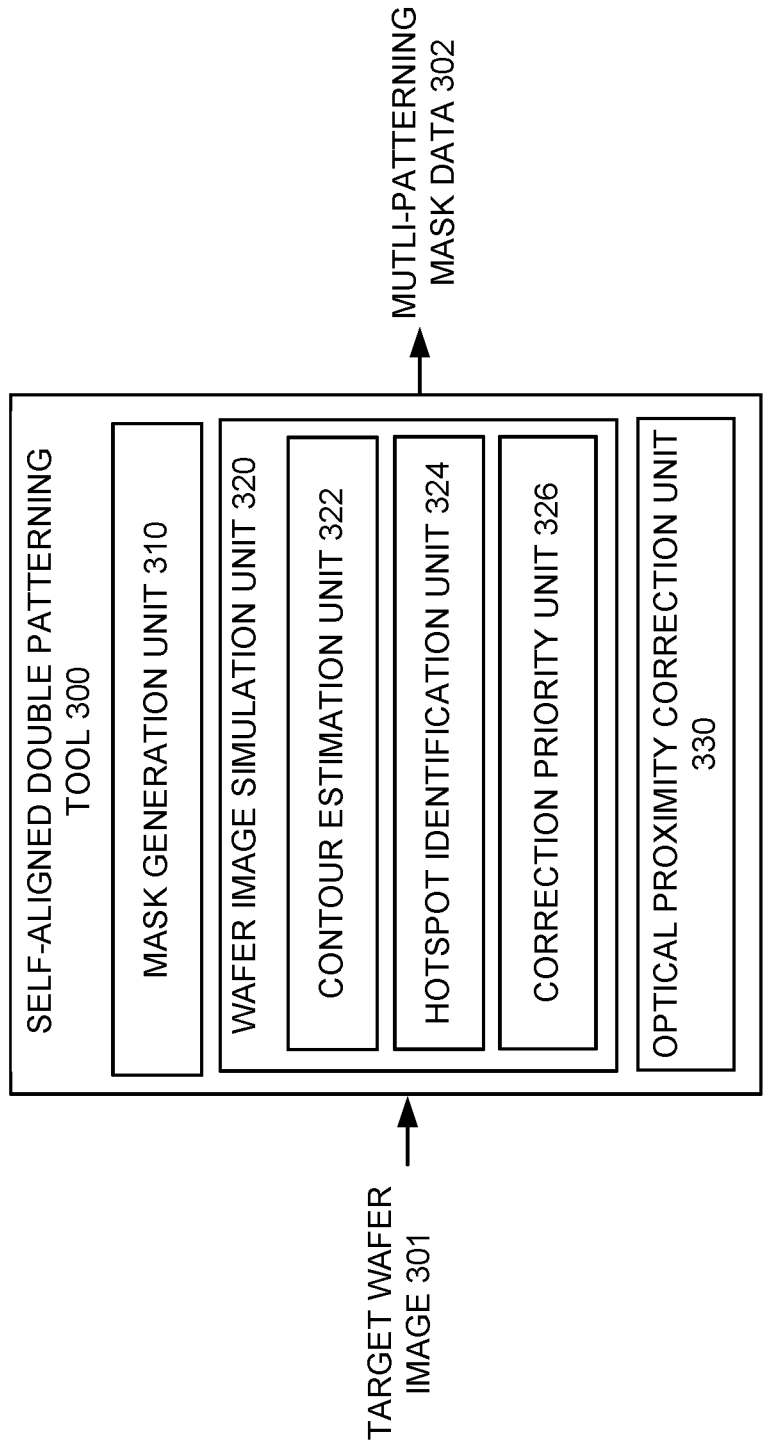
FIG. 3 illustrates an example of a self-aligned double patterning tool to perform pattern correction with dummy simulation that may be implemented according to various embodiments of the invention.

FIG. 3 illustrates an example of a self-aligned double patterning tool 300 to perform pattern correction with dummy simulation that may be implemented according to various embodiments of the invention. Referring to FIG. 3, the self-aligned double patterning tool 300 can receive a target wafer image 301, for example, in a layout design of an electronic system. The layout design can define geometrical information capable of being utilized to manufacture an integrated circuit, such as the electronic system, which can be specified in a Graphic Data System II (GDSII) format, an Open Access format, a Milkyway format, an EDDM format, an Open Artwork System Interchange Standard (OASIS) format, or the like. The self-aligned double patterning tool 300 can include a mask generation unit 310 to generate multi-patterning mask data 302, for example, a mandrel mask and a block or keep mask, based on the target wafer image 301.

FIGS. 4A-4D illustrate example generation of mandrel and keep masks from a target wafer image, which may be implemented according to various embodiments of the invention. Referring to FIGS. 4A-4D, a target wafer image includes multiple geometric elements that, when printed onto a wafer or substrate, can implement the electronic system described in a layout design associated with the target wafer image.

Figure 4B:
FIGS. 4A-4D illustrate example generation of mandrel and keep masks from a target wafer image, which may be implemented according to various embodiments of the invention.
Figure 4B:
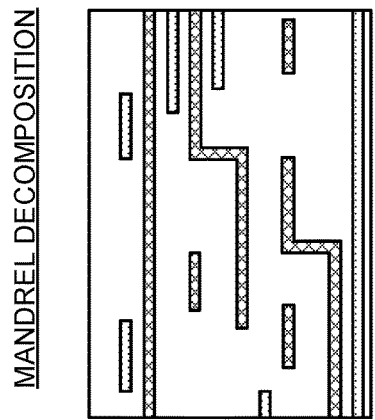
Figure 4D:
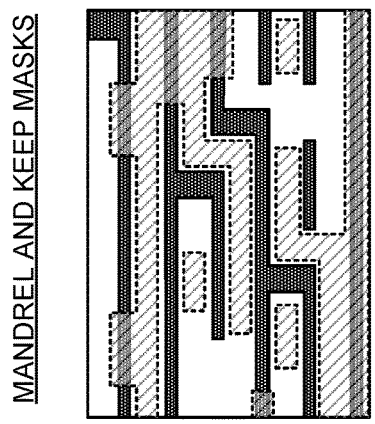
Figure 4A:
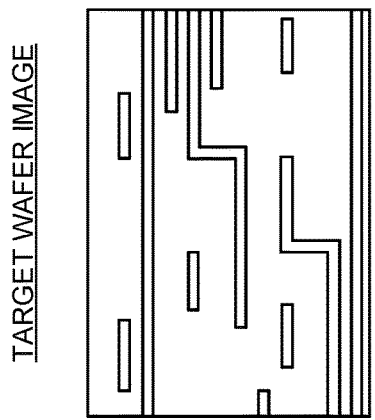
Figure 4C:
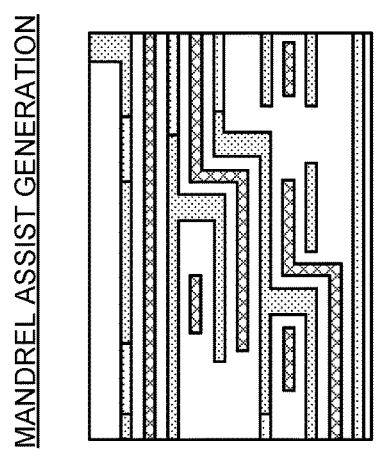

The target wafer image shown in FIG. 4A can be decomposed into mandrel and non-mandrel portions. For example, each of the structures in the target wafer image can be assigned to be a mandrel portion or a non-mandrel portion. The mandrel portions of the target wafer image can be extended with an addition of mandrel assist, which together can to define where mandrels can be printed onto a wafer or substrate utilizing the mandrel mask. The mandrels can have a sidewall images grown on them, which can define some of the edges of the structures in the target wafer image.

The mandrel mask can be formed based on the combination of the mandrel portions and the mandrel assist. The keep mask can be formed based on locations of the mandrel and non-mandrel portions, for example, defining locations structures that can be printed on the wafer or substrate. In some embodiments, the inverse of the keep mask can be a block mask, which can define locations where structures cannot be printed on the wafer or substrate.

Referring back to FIG. 3, the self-aligned double patterning tool 300 can include an optical proximity correction unit 330 to iteratively form an intermediate target image based on the mandrel mask and the block mask. For example, the optical proximity correction unit 330 can determine a mandrel image and corresponding sidewall images from the mandrel mask and the shape of the block mask, which may be utilized to form the intermediate target image. In some embodiments, the optical proximity correction unit 330 can determine the intermediate target image by utilizing complex fragment mapping, which can map sites on a target wafer image to different fragments of the block mask. These fragments of the block mask can be re-fragmented for use during different iterations performed by the optical proximity correction unit 330.

After each iteration, the optical proximity correction unit 330 can determine an error between the target wafer image 301 and the intermediate target image, and modify the block mask based on the determined error. For example, the optical proximity correction unit 330 can determine an edge placement error (EPE), which can be measured distance between the target wafer image 301 and the intermediate target image. The optical proximity correction unit 330 can compare the determined EPE against error tolerances, such as an EPE tolerance, a critical dimension (CD) tolerance, or the like, and alter portions of the block mask in an attempt to have a corresponding version of the intermediate target image fall with the error tolerances. When the iterations performed by the optical proximity correction unit 330 do not identify a block mask configuration capable of generating an intermediate target image that falls with the error tolerances, the optical proximity correction unit 330 perform additional iterations, the target wafer image 301 can be modified or re-targeted, or like. Although FIG. 3 shows the self-aligned double patterning tool 300 including the optical proximity correction unit 330, in some embodiments, optical proximity correction of the masks generated by the mask generation unit 310 can be at least partially implemented in a different tool, which can be external from the self-aligned double patterning tool 300.

The self-aligned double patterning tool 300 can include a wafer image simulation unit 320 to perform a dummy simulation of a wafer image based on the mandrel mask and the keep or block mask generated by the mask generation unit 310, for example, prior to the performance of the optical proximity correction by the optical proximity correction unit 330. The simulated wafer image generated by the wafer image simulation unit 320 can be an approximation of the intermediate target image capable of being generated by the optical proximity correction unit 330. In some embodiments, the wafer simulation unit 320 can generate the simulated wafer image much more quickly than the optical proximity correction unit 330 can generate the intermediate target image, but as a tradeoff for this increased speed, the intermediate target image may be more accurate representation of an image capable of being printed with the mandrel and block masks than the simulated wafer image. As will be described below in greater detail, the wafer image simulation unit 320 can utilize the simulated wafer image to determine when to re-target the target wafer image prior to optical proximity correction, adjust error tolerances to portions of the block mask for the optical proximity correction process, and/or to alter how the optical proximity correction unit 330 derives the error to be compared against the error tolerances. By performing the dummy simulation prior to optical proximity correction, the self-aligned double patterning tool 300 can speed-up the generation of multi-patterning mask data 302, such as a mandrel mask and a block mask, for example, by avoiding optical proximity correction prior to re-targeting, prioritizing block mask edges during optical proximity correction, or by allowing the optical proximity correction process to derive error differently.

The wafer image simulation unit 320 can include a contour estimation unit 322 to utilize the mandrel mask to estimate locations and thicknesses of dummy sidewall images. These dummy sidewall images can correspond to an approximation of sidewall images capable of being grown on mandrels printed on the wafer or substrate utilizing the mandrel mask. In some embodiments, the contour estimation unit 322 can utilize the size of the mandrel images capable of being printed with the mandrel mask to set a size of the dummy sidewall images. The contour estimation unit 322 also can approximate contours of the keep or block mask, for example, converting right angles in the keep mask into smooth curved shapes.

The wafer image simulation unit 320 can utilize the dummy sidewall images and the estimated keep or block mask contours to generate a simulated wafer image. The simulated wafer image can correspond to an approximation of the intermediate wafer image capable of being printed on a substrate or wafer by utilizing the mandrel mask and the keep or block mask. In some embodiments, the wafer image simulation unit 320 can determine a difference between the dummy sidewall images and the estimated keep or block mask contours to identify the simulated wafer image.

The wafer image simulation unit 320 can include a hotspot identification unit 324 to compare the simulated wafer image with the target wafer image 301, and identify deviations of the simulated wafer image from the target wafer image 301 based on the comparison. In some embodiments, when the deviation between the simulated wafer image and the target wafer image 301 exceeds a predetermine threshold, the hotspot identification unit 324 can identify a portion of the simulated wafer image corresponding to the deviation as a hotspot.

Figure 5:
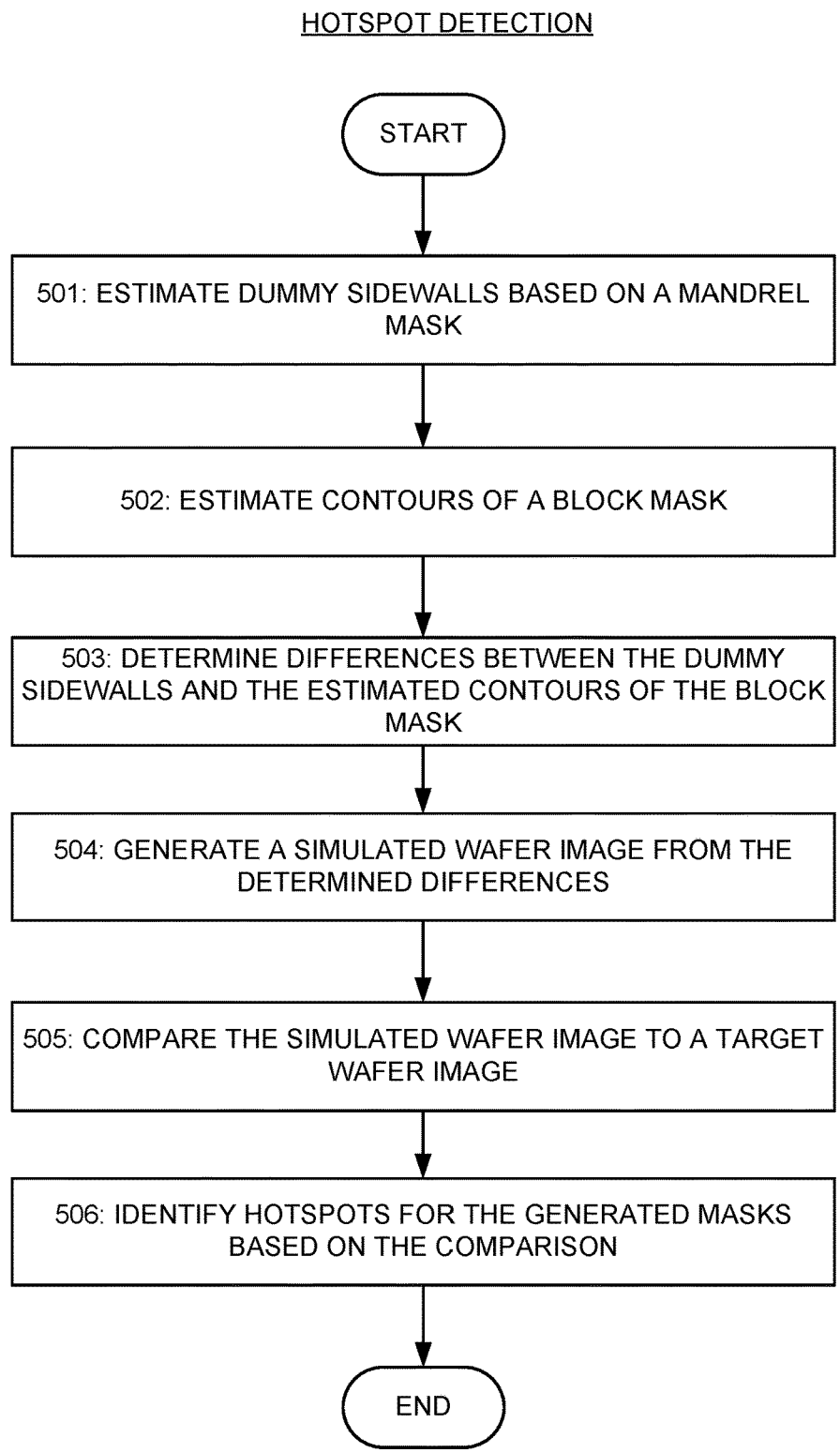
FIG. 5 illustrates a flowchart showing example simulation of a wafer image and corresponding hotspot identification according to various examples of the invention.

FIG. 5 illustrates a flowchart showing example simulation of a wafer image and corresponding hotspot identification according to various examples of the invention. Referring to FIG. 5, in a block 501, a computing system, implementing a self-aligned double patterning tool, can estimate dummy sidewalls based on a mandrel mask. The computing system can utilize the mandrel mask to estimate locations and thicknesses of dummy sidewalls or dummy sidewall images. These dummy sidewalls can correspond to an approximation of sidewall capable of being grown on mandrels printed on the wafer or substrate utilizing the mandrel mask. In some embodiments, the computing system can utilize the size of the mandrels capable of being printed with the mandrel mask to set a size of the dummy sidewall.

In a block 502, the computing system, implementing a self-aligned double patterning tool, can estimate contours of a block mask. The computing system, in some embodiments, can approximate the contours of the block mask by smoothing out the angles in the block mask, for example, converting right angles in the block mask into smooth curved surfaces or edges.

In a block 503, the computing system, implementing the self-aligned double patterning tool, can determine differences between the dummy sidewalls and the estimated contours of the block mask, and in a block 504, the computing system, implementing the self-aligned double patterning tool, can generate a simulated wafer image from the determined differences. The simulated wafer image can correspond to an approximation of a wafer image capable of being printed on a substrate or wafer by utilizing the mandrel mask and the block mask.

In a block 505, the computing system, implementing the self-aligned double patterning tool, can compare the simulated wafer image to a target wafer image. In some embodiments, the computing system can overlay the simulated wafer image on the target wafer image to determine whether the simulated wafer image includes spikes or spurs that cause the simulated wafer image to include excess features, or reverse spikes or reverse spurs where target features were omitted from the simulated wafer image.

In a block 506, the computing system, implementing the self-aligned double patterning tool, can identify hotspots for the mandrel and/or block masks based on the comparison. In some embodiments, the hotspots can correspond to locations in the simulated wafer image that are not closely matched to the target wafer image, i.e. a presence of spikes or spurs, or reverse spikes or spurs. The computing system can associate the identified hotspots in the simulated wafer image to portions of the block mask, mandrel mask, and/or the target wafer image.

Figure 6A:
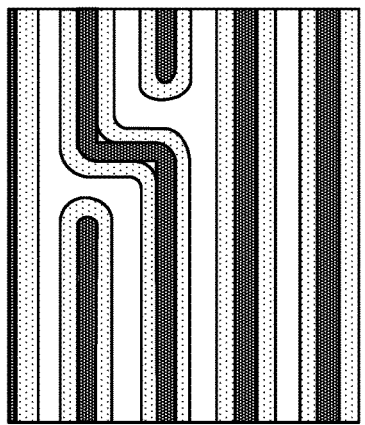
FIGS. 6A-6D illustrate example simulation of a wafer image from mandrel and block masks, which may be implemented according to various embodiments of the invention.

FIGS. 6A-6D illustrate example simulation of a wafer image from mandrel and block masks, which may be implemented according to various embodiments of the invention. Referring to FIG. 6A, the mandrel mask can define locations mandrel structures can be printed on the wafer or substrate. The keep mask can define locations where target structures that can be printed on the wafer or substrate. In some embodiments, the inverse of the keep mask can be a block mask, which can define locations where the target structures cannot be printed on the wafer or substrate.

Figure 6B:
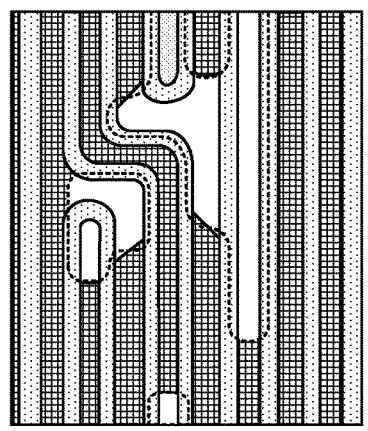
Figure 6C:
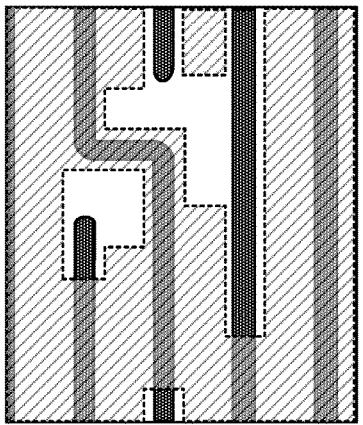
Figure 6D:
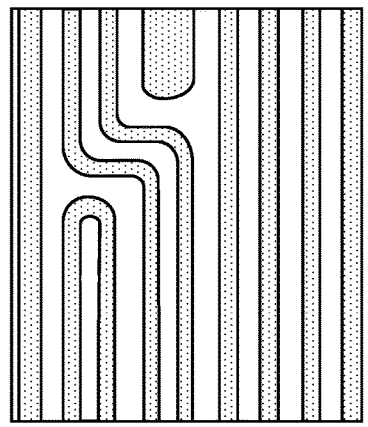

Referring to FIGS. 6B-6D, during a dummy simulation of the wafer image, the mandrel mask can be utilized to estimate mandrel structures capable of being printed on the wafer or substrate. The estimated mandrel structures can be utilized to approximate mandrel sidewalls. Since mandrel structures can have mandrel sidewalls grown on them, the dummy simulation can estimate locations and sizes of mandrel sidewalls based on the mandrel structures estimated from the mandrel mask. In some embodiments, the mandrel sidewalls can be located surrounding and, in some cases, encapsulating the mandrel structures. The size of the approximated mandrel sidewalls can be relative to the size of the mandrel structures estimated from the mandrel mask.

The simulated wafer image can be derived or formed based on a difference between the approximated mandrel sidewalls and an approximated block or keep mask. The dummy simulation can estimate contours of the block or keep mask by smoothing out the angles in the block or keep mask, for example, converting right angles in the block or keep mask into smooth curved surfaces or edges.

Referring back to FIG. 3, the wafer image simulation unit 320 can include a correction priority unit 326 to utilize the hotspots identified by the hotspot identification unit 324 to determine whether the target wafer image should be modified or re-targeted prior to optical proximity correction. In some embodiments, the correction priority unit 326 can re-target the target wafer image 301 or direct another tool external from the self-aligned double patterning tool to perform the re-targeting of the target wafer image corresponding to the identified hotspots.

The correction priority unit 326 can utilize the hotspots identified by the hotspot identification unit 324 to selectively set or modify error tolerances corresponding to optical proximity correction of the block mask. For example, the correction priority unit 326 can tighten error tolerances for portions of the block mask associated with hotspots identified through the dummy simulation. The correction priority unit 326 also may relax error tolerances for other portions of the block mask not associated with hotspots identified through the dummy simulation. As will be described below in greater detail, the relaxing of the error tolerances for the other portions of the block mask can be utilized by the optical proximity correction unit 330 to allow for the block mask associated with hotspots to be able to fall within the tightened error tolerances. The correction priority unit 326 also may direct the optical proximity correction process to alter its derivation of errors in the intermediate target image, which will also be described below in greater detail.

Figure 7:
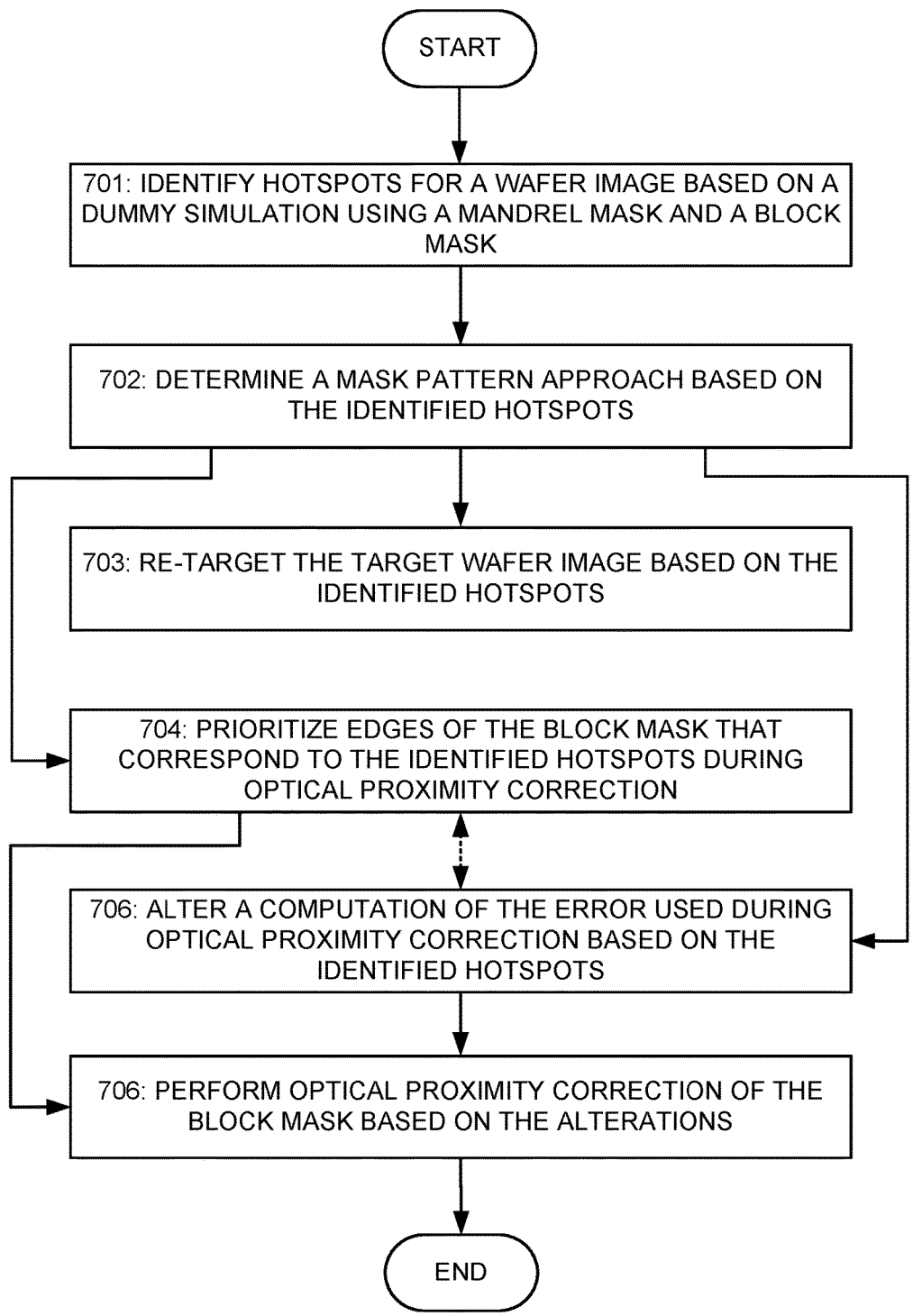
FIG. 7 illustrates a flowchart showing example pattern correction for hotspots identified from a simulated wafer image according to various examples of the invention.

FIG. 7 illustrates a flowchart showing example pattern correction for hotspots identified from a simulated wafer image according to various examples of the invention.

Referring to FIG. 7, in a block 701, a computing system, implementing a self-aligned double patterning tool, can identify hotspots for a wafer image based on a dummy simulation using a mandrel mask and a block mask. The hotspots can correspond to locations in a simulated wafer image that are not closely matched to a target wafer image, i.e. a presence of spikes or spurs, or reverse spikes or spurs. The computing system can associate the identified hotspots in the simulated wafer image to portions of the block mask, mandrel mask, and/or the target wafer image. The computing system can perform the dummy simulation by estimating dummy sidewalls based on the mandrel mask, estimating contours of the block mask, and determining differences between dummy sidewalls and the estimated contours of the block mask to generate the wafer image.

In a block 702, the computing system, implementing the self-aligned double patterning tool, can determine a mask pattern correction approach based on the identified hotspots. The computing system can analyze the hotspots and corresponding deviations between the simulated wafer image and the target wafer image to determine whether the target wafer image should be re-targeted or go through an optical proximity correction process. The computing system also can determine whether to modify the optical proximity correction process, for example, by prioritizing correction of edges in a block mask based on the identified hotspots, alter error calculations during the optical proximity correction process, or the like. The computing system can make these determinations based on a magnitude of one or more deviations between the simulated wafer image and the target wafer image, a type of deviation, such as a line-end spike or spur, a mid-line deviation, or the like.

In a block 703, the computing system, implementing the self-aligned double patterning tool, can re-target the target wafer image based on the identified hotspots. When the computing system analyzes the hotspots and determines the target wafer image should be re-targeted rather than go through an optical proximity correction process, the computing system can re-target the target wafer image. In some embodiments, the computing system can selectively re-target portions of the target wafer image corresponding to identified hotspots. The computing system, in some embodiments, can prompt an external tool to perform the re-targeting of the target wafer image, for example, outputting the identified hotspots associated with the target wafer image to the external tool.

In a block 704, the computing system, implementing the self-aligned double patterning tool, can prioritize edges of the block mask that correspond to the identified hotspots for use during optical proximity correction. For example, the computing system can tighten error tolerances for portions of the block mask associated with identified hotspots. The computing system also may relax error tolerances for other portions of the block mask not associated with identified hotspots. An example of edge prioritization will be described below in FIG. 8.

Figure 8:
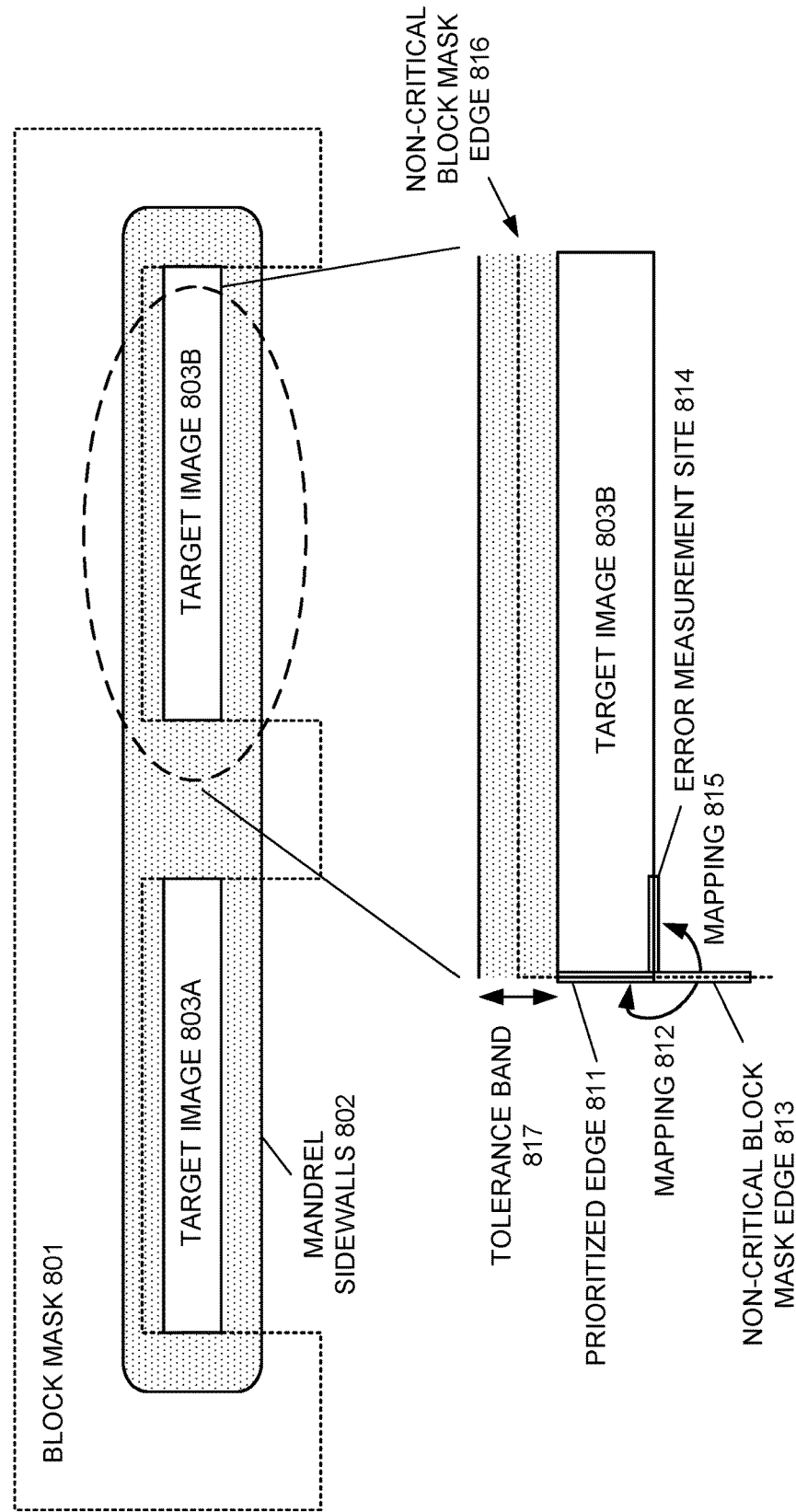
FIG. 8 illustrates an example edge prioritization for a hotspot identified from a simulated dummy wafer image, which may be implemented according to various embodiments of the invention.

FIG. 8 illustrates an example edge prioritization for a hotspot identified from a simulated dummy wafer image, which may be implemented according to various embodiments of the invention. Referring to FIG. 8, during optical proximity correction, a computing system can determine an intermediate target image based on a mandrel mask and a block mask 801. The computing system can identify mandrel sidewalls 802 capable of being printed on a wafer with the mandrel mask, and then utilize the mandrel sidewalls 802 and the block mask 801 to determine the intermediate target image. The intermediate target image can include multiple target image portions, such as target image 803A and 803B.

Prior to performance of the optical proximity correction, the computing system, based on a dummy simulation, can prioritize edges of the block mask 801 for utilization during the optical proximity correction. The dummy simulation can identify a hotspot corresponding to an edge of the block mask 801, which the computing system can prioritize. For example, the prioritized edge 811 of the block mask 801, which cuts across the target image 803B, can correspond to a hotspot identified during the dummy simulation. The computing system can tighten the error tolerance allowable for the prioritized edge 811 during optical proximity correction. The reduced allowable error for this edge can cause the computing system implementing the optical proximity correction to prioritize alteration of the block mask in order to have the prioritized edge 811 fall within the tightened error tolerance.

In some embodiments, the computing system can relax error tolerances for edges in the intermediate target image that did not correspond to hotspots in the dummy simulation. In this example, the computing system can relax an error tolerance for a non-critical block mask edge 813. Since the non-critical block mask edge 813 is adjacent to the prioritized edge, alteration of the non-critical block mask edge 813 can influence the shape of the target image 803B at the prioritized edge 811. The computing system can generate a mapping 812 that can identify the relationship between the non-critical block mask edge 813 and the prioritized edge 811. During optical proximity correction, the computing system can utilize the mapping 812 to alter the non-critical block mask edge 813 in order to alter the prioritized edge 811, so that the prioritized edge 811 can fall within the tightened error tolerance range.

Alteration of the non-critical block mask edge 813, however, can also influence the shape of the target image 803B at different locations, such as the bottom edge of the target image 803B. In this situation, the computing system can generate an error measurement site 814 for the bottom edge of the target image 803B, which are normally reserved for edges of the block mask 801. The computing system also can generate a mapping 815 that can identify the relationship between the non-critical block mask edge 813 and the error measurement site 814. During optical proximity correction, the computing system can utilize the mapping 815 when altering the non-critical block mask edge 813 to ensure that any alteration of the non-critical block mask edge 813 for a benefit of the prioritized edge 811 does not degrade the bottom edge of the target image 803B corresponding to the error measurement site 814 beyond an error tolerance.

The computing system also can relax an error tolerance for a non-critical block mask edge 816. In some embodiments, the computing system can relax the error tolerance for the non-critical block mask edge 816, so that it falls within the mandrel side wall 802. This relaxing of the error tolerance can provide the non-critical block mask edge 816 a tolerance band 817, which can be as wide as the mandrel sidewall associated with the top of the target image 803B.

Referring back to FIG. 7, in a block 705, the computing system, implementing the self-aligned double patterning tool, can alter a computation of the error used during optical proximity correction based on the identified hotspots. During optical proximity correction, an edge placement error (EPE) can be a measured distance between a target wafer image and the intermediate target image. The computing system, based on the hotspots identified in dummy simulation, can change how some edge placement errors and critical dimension (CD) errors are computed. For example, since some target image line ends can have spikes or spurs (and reverse spikes and reverse spurs), each having a different slope of its edge, rather than measure the line ends against the fixed target wafer image, the computing system can set protrusion and pullback boundaries for each line end and measure error for the line ends as a difference between a line edge protrusion and a line edge pullback that fall within the boundaries. An example of the altered edge placement error computation will be described below in FIGS. 9A-9C.

Figure 9A:
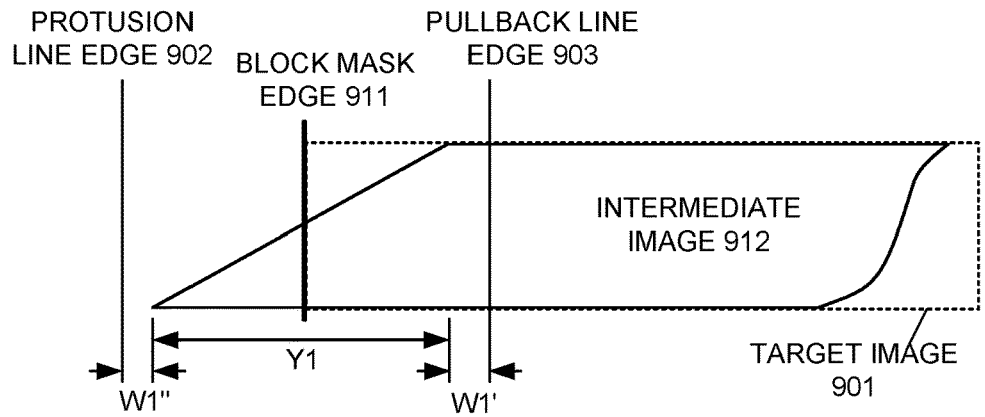
FIGS. 9A-9C illustrate another example altered edge placement error computation based on a hotspot identified from a simulated dummy image, which may be implemented according to various embodiments of the invention.
Figure 9B:
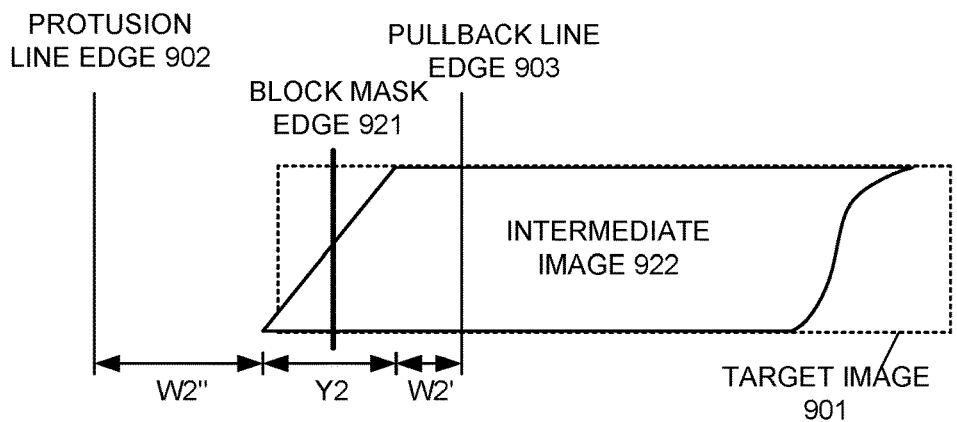
Figure 9C:
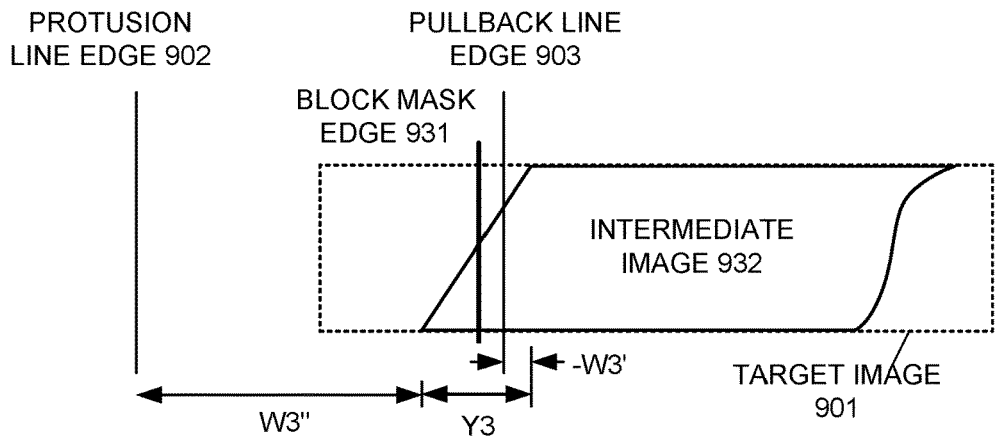

FIGS. 9A-9C illustrate another example altered edge placement error computation based on a hotspot identified from a simulated dummy image, which may be implemented according to various embodiments of the invention. Referring to FIG. 9A, an intermediate image 912, developed during optical proximity correction based on mandrel mask and an edge of a block mask 911, is shown relative to a target image 901. Conventionally, a computing system would determine an edge placement error by comparing a line edge of the intermediate image 912 to the target image 901.

In the altered edge placement error computation, however, the computing system can utilize a line edge boundary defined by a protrusion line edge 902 and a pullback line edge 903. The protrusion line edge 902 can define a maximum allowable distance the intermediate image 912 can extend past the edge of the target image 901. The pullback line edge 903 can define a maximum allowable distance the intermediate image 912 can be pulled-back from the edge of the target image 901. The computing system can compute error for the intermediate image 912 by determining whether a protrusion and a pullback for the intermediate image 912 fall within the line edge boundary. A distance between the protrusion line edge 902 and the protrusion of the intermediate image 912 can be computed, which is shown as W1" in FIG. 9A. A distance between the pullback line edge 903 and the pullback of the intermediate image 912 can be computed, which is shown as W1' in FIG. 9A. The computing system also can compute error for the intermediate image 912 by measuring a distance between the protrusion and the pullback for the intermediate image 912, which is shown as Y1 in FIG. 9A. Since the distance Y1 can be associated with a line end angle or slope, the smaller the distance Y1, the closer the line end can be to the target image 901. The computing system can utilize the error measurements W1", W1', and Y1 to alter the block mask edge 911.

Referring to FIG. 9B, an intermediate image 922, developed during optical proximity correction based on mandrel mask and an edge of a block mask 921, is shown relative to a target image 901. The computing system can compute error for the intermediate image 922 by determining whether a protrusion and a pullback for the intermediate image 922 fall within the line edge boundary. A distance between the protrusion line edge 902 and the protrusion of the intermediate image 922 can be computed, which is shown as W2" in FIG. 9B. A distance between the pullback line edge 903 and the pullback of the intermediate image 922 can be computed, which is shown as W2' in FIG. 9B. The computing system also can compute error for the intermediate image 922 by measuring a distance between the protrusion and the pullback for the intermediate image 922, which is shown as Y2 in FIG. 9B. Since the distance Y2 can be associated with a line end angle or slope, the smaller the distance Y2, the closer the line end can be to the target image 901.

The computing system can utilize the error measurements W2", W2', and Y2 to alter the block mask edge 921. The computing system also can utilize the error measurements W2", W2', and Y2 to compare the intermediate image 922 against other intermediate images determined by the computing system. For example, since the distance Y2 between the protrusion and the pullback for the intermediate image 922 is less than the distance Y1 shown in FIG. 9A, the intermediate image 922 has less error than the intermediate image 912 shown in FIG. 9A.

Referring to FIG. 9C, an intermediate image 932, developed during optical proximity correction based on mandrel mask and an edge of a block mask 931, is shown relative to a target image 901. The computing system can compute error for the intermediate image 932 by determining whether a protrusion and a pullback for the intermediate image 932 fall within the line edge boundary. A distance between the protrusion line edge 902 and the protrusion of the intermediate image 932 can be computed, which is shown as W3" in FIG. 9C. A distance between the pullback line edge 903 and the pullback of the intermediate image 932 can be computed, which is shown as W3' in FIG. 9C. The computing system also can compute error for the intermediate image 932 by measuring a distance between the protrusion and the pullback for the intermediate image 932, which is shown as Y3 in FIG. 9C. Since the distance Y3 can be associated with a line end angle or slope, the smaller the distance Y3, the closer the line end can be to the target image 901. The computing system can utilize the error measurements W3", W3', and Y3 to alter the block mask edge 931. For example, since the intermediate image 932 has a pullback that exceeds the pullback line edge 903 of the boundary, the computing system can determine the intermediate image 932 falls outside of an error tolerance.

Referring back to FIG. 7, in a block 706, the computing system, implementing the self-aligned double patterning tool, can perform optical proximity correction of the block mask based on the alterations. During the optical proximity correction, the computing system can form a complete mandrel image and corresponding sidewall image, for example, by iteratively altering the mandrel mask in order to form the complete mandrel image and corresponding sidewall image. The computing system can utilize the complete mandrel image and corresponding sidewall image when performing block or keep mask optical proximity correction.

The computing system can determine an intermediate image from the block or keep mask and the complete mandrel image and corresponding sidewall image, calculate errors in the intermediate image. As discussed above, the errors in the intermediate image can be differences between the intermediate image and a target wafer image, or the errors can correspond to a line end protrusion-pullback difference relative a line end boundary. The computing system can determine whether the computed errors fall within error tolerances for the intermediate image, some of which may be tightened or relaxed based on dummy simulation. Based on a comparison of the computed errors to the error tolerances, the computing system can alter the block or keep mask and proceed to determining another intermediate image with the altered block or keep mask and the complete mandrel image and corresponding sidewall image. This iterative process can continue until an intermediate image falls within the error tolerances, a predetermine number of iterations have been performed, a predetermined time period has expired, or the like.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    simulating, by a computing system, a wafer image based on a mandrel mask and a block mask capable of being utilized in a formation of a final wafer image printed on a substrate;
    comparing, by the computing system, a target wafer image in a layout design to the simulated wafer image;
    modifying, by the computing system, error tolerances utilized in optical proximity correction of the block mask based, at least in part, on deviations between the simulated wafer image and the target wafer image; and
    performing, by the computing system, the optical proximity correction with the modified error tolerances to set a configuration of the block mask, wherein the substrate, when manufactured based on the block mask having the configuration set by the optical proximity correction, includes the final wafer image.

2. The method of claim 1, wherein simulating the wafer image further comprises:
    estimating dummy sidewalls based on the mandrel mask;
    estimating contours of the block mask; and
    determining the simulated wafer image based on the dummy sidewalls and the estimated contours of the block mask.

3. The method of claim 1, further comprising identifying, by the computing system, hotspot regions in the target wafer image based on the deviations between the simulated wafer image and the target wafer image, wherein modifying the error tolerances further comprising tightening the error tolerances for portions of the block mask associated with the hotspot regions in the target wafer image.

4. The method of claim 3, further comprising:
    selectively relaxing, by the computing system, error tolerances utilized in optical proximity correction for other portions of the block mask that do not correspond to the hotspot regions; and
    mapping, by the computing system, a relationship between the other portions of the block mask to the portions of the block mask associated with the hotspot regions, wherein performance of the optical proximity correction utilizes the mapping to alter the block mask so the final wafer image falls within the modified error tolerances.

5. The method of claim 3, further comprising:
    adding, by the computing system, a measurement site for use in the optical proximity correction of the block mask to a location outside of the block mask; and
    mapping, by the computing system, the added measurement site to at least one of the other portions of the block mask that do not correspond to the hotspot regions, wherein performance of the optical proximity correction utilizes the mapping to alter the block mask so the final wafer image falls within the modified tolerances.

6. The method of claim 1, further comprising performing, by the computing system, the optical proximity correction to derive an intermediate wafer image based, at least in part, on the block mask, determine errors in the intermediate wafer image, alter the block mask based on a comparison of the errors to the modified error tolerances.

7. The method of claim 6, wherein the modified tolerances define a boundary for line edge protrusion and for line edge pullback of the intermediate wafer image, and wherein the performance of the optical proximity correction determines errors in the intermediate wafer image by ascertaining whether line edges in the intermediate wafer image fall within the boundary for line edge protrusion and for line edge pullback.

8. A system comprising:
    a memory device configured to store machine-readable instructions; and
    a computing system including one or more processing devices, in response to executing the machine-readable instructions, configured to:
        simulate a wafer image based on a mandrel mask and a block mask capable of being utilized in formation of a final wafer image printed on a substrate;
        compare a target wafer image in a layout design to the simulated wafer image;
        modify error tolerances utilized in optical proximity correction of the block mask based, at least in part, on deviations between the simulated wafer image and the target wafer image; and
        perform the optical proximity correction with the modified error tolerances to set a configuration of the block mask, wherein the substrate, when manufactured based on the block mask having the configuration set by the optical proximity correction, includes the final wafer image.

9. The system of claim 8, wherein the one or more processing devices, in response to executing the machine-readable instructions, are configured to:
    identify hotspot regions in the target wafer image based on the deviations between the simulated wafer image and the target wafer image; and
    tighten the error tolerances for portions of the block mask associated with the hotspot regions in the target wafer image.

10. The system of claim 9, wherein the one or more processing devices, in response to executing the machine-readable instructions, are configured to:
    selectively relax error tolerances utilized in optical proximity correction for other portions of the block mask that do not correspond to the hotspot regions; and
    map a relationship between the other portions of the block mask to the portions of the block mask associated with the hotspot regions, wherein performance of the optical proximity correction utilizes the mapping to alter the block mask so the final wafer image falls within the modified error tolerances.

11. The system of claim 9, wherein the one or more processing devices, in response to executing the machine-readable instructions, are configured to:
add a measurement site for use in the optical proximity correction of the block mask to a location outside of the block mask; and
map the added measurement site to at least one of the other portions of the block mask that do not correspond to the hotspot regions, wherein performance of the optical proximity correction utilizes the mapping to alter the block mask so the final wafer image falls within the modified tolerances.

12. The system of claim 8, wherein the one or more processing devices, in response to executing the machine-readable instructions, are configured to
perform the optical proximity correction to derive an intermediate wafer image based, at least in part, on the block mask, determine errors in the intermediate wafer image, alter the block mask based on a comparison of the errors to the modified error tolerances.

13. The system of claim 12, wherein the modified tolerances define a boundary for line edge protrusion and for line edge pullback of the intermediate wafer image, and wherein the one or more processing devices, in response to executing the machine-readable instructions, are configured to determines the error in the intermediate wafer image by ascertaining whether line edges in the intermediate wafer image fall within the boundary for line edge protrusion and for line edge pullback.

14. An apparatus comprising at least one computer-readable memory device storing instructions configured to cause one or more processing devices to perform operations comprising:
simulating a wafer image based on a mandrel mask and a block mask capable of being utilized in a formation of a final wafer image printed on a substrate;
comparing a target wafer image in a layout design to the simulated wafer image;
modifying error tolerances utilized in optical proximity correction of the block mask based, at least in part, on deviations between the simulated wafer image and the target wafer image; and
performing the optical proximity correction with the modified error tolerances to set a configuration of the block mask, wherein the substrate, when manufactured based on the block mask having the configuration set by the optical proximity correction, includes the final wafer image.

15. The apparatus of claim 14, wherein the instructions are configured to cause one or more processing devices to perform operations further comprising:
identifying hotspot regions in the target wafer image based on the deviations between the simulated wafer image and the target wafer image, wherein modifying the error tolerances further comprising tightening the error tolerances for portions of the block mask associated with the hotspot regions in the target wafer image.

16. The apparatus of claim 15, wherein the instructions are configured to cause one or more processing devices to perform operations further comprising:
selectively relaxing error tolerances utilized in optical proximity correction for other portions of the block mask that do not correspond to the hotspot regions; and
mapping a relationship between the other portions of the block mask to the portions of the block mask associated with the hotspot regions, wherein performance of the optical proximity correction utilizes the mapping to alter the block mask so the final wafer image falls within the modified error tolerances.

17. The apparatus of claim 15, wherein the instructions are configured to cause one or more processing devices to perform operations further comprising:
adding a measurement site for use in the optical proximity correction of the block mask to a location outside of the block mask; and
mapping the added measurement site to at least one of the other portions of the block mask that do not correspond to the hotspot regions, wherein performance of the optical proximity correction utilizes the mapping to alter the block mask so the final wafer image falls within the modified tolerances.

18. The apparatus of claim 14, wherein the instructions are configured to cause one or more processing devices to perform operations further comprising performing the optical proximity correction to derive an intermediate wafer image based, at least in part, on the block mask, determine errors in the intermediate wafer image, alter the block mask based on a comparison of the errors to the modified error tolerances.

19. The apparatus of claim 18, wherein the modified tolerances define a boundary for line edge protrusion and for line edge pullback of the intermediate wafer image, and wherein the performance of the optical proximity correction determines errors in the intermediate wafer image by ascertaining whether line edges in the intermediate wafer image fall within the boundary for line edge protrusion and for line edge pullback.

20. The apparatus of claim 14, further comprising modifying the target wafer image in the layout design based, at least in part, on deviations between the simulated wafer image and the target wafer image.

* * * * *